(12) United States Patent
Bennett et al.

(10) Patent No.: US 10,437,866 B2
(45) Date of Patent: Oct. 8, 2019

(54) LEARNING AND USING CONTEXTUAL CONTENT RETRIEVAL RULES FOR QUERY DISAMBIGUATION

(71) Applicant: Microsoft Corporation, Redmond, WA (US)

(72) Inventors: Paul Bennett, Kirkland, WA (US); Kevyn Collins-Thompson, Ann Arbor, MI (US); Siranush Sarkizova, Seattle, WA (US); Milad Shokouhi, Cambridge (GB); Marc Sloan, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 404 days.

(21) Appl. No.: 14/306,500

(22) Filed: Jun. 17, 2014

(65) Prior Publication Data

US 2015/0363485 A1 Dec. 17, 2015

(51) Int. Cl.
*G06F 16/332* (2019.01)
*G06F 16/84* (2019.01)
*G06F 16/951* (2019.01)
*G06F 16/2455* (2019.01)
*G06F 16/33* (2019.01)

(52) U.S. Cl.
CPC .... *G06F 16/3325* (2019.01); *G06F 16/24564* (2019.01); *G06F 16/3338* (2019.01); *G06F 16/86* (2019.01); *G06F 16/951* (2019.01); *G06F 16/332* (2019.01); *G06F 16/3331* (2019.01)

(58) Field of Classification Search
CPC ............. G06F 17/30867; G06F 16/332; G06F 16/3331
See application file for complete search history.

(56) References Cited

U.S. PATENT DOCUMENTS

| 6,968,332 B1* | 11/2005 | Milic-Frayling ................ G06F 17/30867 707/723 |
| 7,577,665 B2 | 8/2009 | Ramer et al. |
| 7,725,485 B1* | 5/2010 | Sahami ............... G06F 17/3069 707/766 |
| 7,739,264 B2 | 6/2010 | Jones et al. |
| 8,301,639 B1 | 10/2012 | Myllymaki et al. |
| 8,316,019 B1* | 11/2012 | Ainslie ............... G06F 17/3097 707/733 |
| 8,478,699 B1* | 7/2013 | Alfonseca ........... G06F 17/3064 706/12 |
| 8,645,390 B1* | 2/2014 | Oztekin ............ G06F 17/30867 707/721 |

(Continued)

OTHER PUBLICATIONS

"Response to the International Search Report and Written Opinion Issued in PCT Application No. PCT/US2015/035905", Filed Date: Dec. 11, 2015, 16 Pages.

(Continued)

*Primary Examiner* — Charles E Lu
(74) *Attorney, Agent, or Firm* — Medley, Behrens & Lewis, LLC

(57) ABSTRACT

Various technologies related to generating and applying content retrieval rules are described herein. A content retrieval rule maps a combination of a query and a context to one of a query reformulation or content. The content retrieval rule is learned from search logs of a search engine, and is applied when the query having the context is received at the search engine.

20 Claims, 10 Drawing Sheets

(56) References Cited

U.S. PATENT DOCUMENTS

| | | | |
|---|---|---|---|
| 2008/0120276 A1 | 5/2008 | Chennavasin | |
| 2008/0313162 A1 | 12/2008 | Bahrami et al. | |
| 2009/0043749 A1 | 2/2009 | Garg | |
| 2009/0132505 A1 | 5/2009 | Vegnaduzzo et al. | |
| 2012/0158685 A1* | 6/2012 | White | G06F 17/30867 707/706 |
| 2012/0166468 A1* | 6/2012 | Gupta | G06F 17/3087 707/768 |
| 2012/0233140 A1 | 9/2012 | Collins-Thompson et al. | |
| 2013/0117259 A1 | 5/2013 | Ackerman et al. | |
| 2013/0332438 A1 | 12/2013 | Li et al. | |

OTHER PUBLICATIONS

"Written Opinion Issued in PCT Application No. PCT/US2015/035905", dated Apr. 11, 2016, 8 Pages.

"International Preliminary Report on Patentability Issued in PCT Application No. PCT/US2015/035905", dated Jul. 8, 2016, 13 Pages.

Budzik, et al., "Information Access in Context", In Journal of Knowledge-Based Systems, vol. 14, Issues 1-2, Mar. 1, 2001, pp. 37-53.

Cao, et al., "Towards Context-Aware Search by Learning a Very Large Variable length Hidden Markov Model from Search Logs", In Proceedings of the 18th International Conference on World Wide Web, Apr. 20, 2009, pp. 191-200.

Kramar, et al., "Disambiguating Search by Leveraging a Social Context Based on the Stream of User's Activity", In Proceedings of 18th International Conference User Modeling, Adaptation and Personalization, Jun. 20, 2010, pp. 387-392.

"International Search Report and Written Opinion Issued in PCT Application No. PCT/US2015/035905", dated Aug. 27, 2015, 18 Pages.

Rose, et al., "Understanding User Goals in Web Search", In Proceedings of the 13th International Conference on World Wide Web, May 17, 2004, pp. 13-19.

Sengstock, et al., "Conquer: A System for Efficient Context-Aware Query Suggestions", In Proceedings of the 20th International Conference Companion on World Wide Web, Mar. 28, 2011, pp. 265-268.

* cited by examiner

LEARNING AND USING CONTEXTUAL CONTENT RETRIEVAL RULES FOR QUERY DISAMBIGUATION

BACKGROUND

Queries issued to a search engine are often underspecified or ambiguous. In an example, a user that issues the query "bulls" may be referring to stocks, animals, a sports team, an event in Pamplona, etc. Conventional search engines have difficulty disambiguating the information retrieval (IR) intent of the user and, therefore, may provide search results that are not relevant to the user. This in turn can cause the user to become disenfranchised with the search engine, thereby causing the user to use a different search engine.

SUMMARY

The following is a brief summary of subject matter that is described in greater detail herein. This summary is not intended to be limiting as to the scope of the claims.

A computing system is described herein. The computing includes a processor and a memory, where the memory comprises a rule applier system that is executed by the processor. The rule applier system is configured to assign a context to a query responsive to receiving the query. The rule applier system is also configured to identify a content retrieval rule based upon the query and the context assigned to the query, where the content retrieval rule maps a combination of the query and the context to one of content or a query reformulation. The rule applier system is further configured to execute the content retrieval rule responsive to identifying the content retrieval rule.

DETAILED DESCRIPTION

Figure 2:
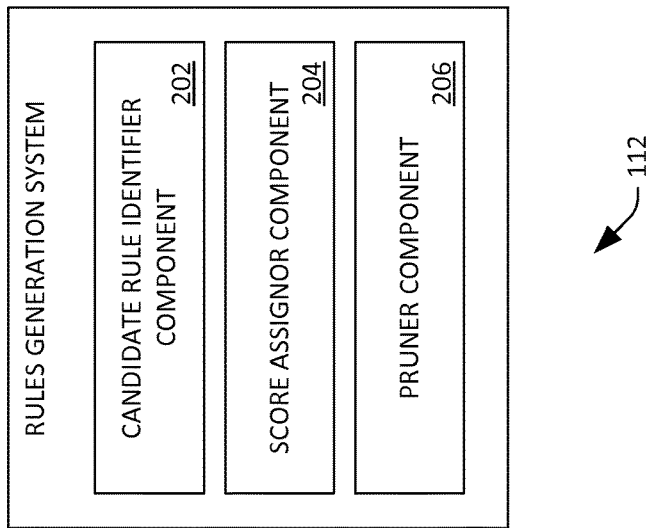
FIG. 2 is a functional block diagram of an exemplary rules generation system that is configured to generate content retrieval rules based upon search engine logs.

Various technologies pertaining to generating and applying content retrieval rules are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Figure 1:
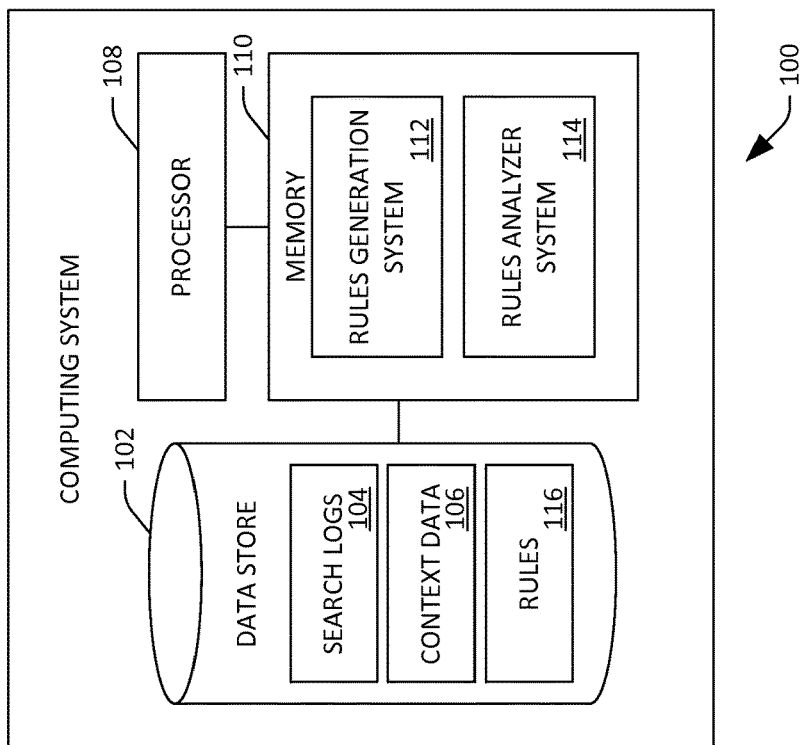
FIG. 1 is a functional block diagram of an exemplary computing system that facilitates creation and analysis of content retrieval rules.

With reference now to FIG. 1, an exemplary computing system 100 that is configured to generate content retrieval rules is illustrated. As will be described in greater detail herein, the content retrieval rules are generated based upon respective contexts of users who issue queries to a search engine. The computing system 100 may be a computing device or a distributed computing system. For example, the computing system 100 may be or may be included in an enterprise computing system, a data center, etc. Accordingly, elements of the computing system 100 may be included on a single device or distributed across multiple computing devices.

The computing system 100 comprises a data store 102. The data store 102 includes historic search logs 104 of a search engine. The search logs 104 can include, but is not limited to including: 1) identifiers for respective users (e.g., wherein the identifiers anonymously identify users); 2)

queries issued by the users; 3) identities of search results presented to the users based upon issued queries; 4) identities of search results selected by the users; 5) labels assigned to search results identified as satisfying an IR intent of the users (e.g., a search result can be labeled as satisfying the IR intent of a user if dwelled upon by the user for some threshold amount of time (e.g., 30 seconds) or if the search result is the last search result viewed in a search session); and 6) timestamps assigned to queries that indicate when the queries were issued; 7) timestamps assigned to search results selected by users that indicate when the search results were selected; 8) timestamps assigned to search results selected by users that indicate how long the search results were dwelled upon by users, etc. The search logs 104 can further include identities of particular search sessions, where a search session can be defined by user interaction with the search engine. For instance, interactions in a sequence of interactions can define a search session, where a time duration between each consecutive interaction is less than a predefined threshold duration, such as five minutes, ten minutes, twenty minutes, thirty minutes, or the like. Thus, in a search session, the user "continuously" interacts with the search engine. Further, while not shown, the data store 102 can include information not directly captured by the search engine, such as web pages visited by users, demographic information about users, social media data (e.g., indications of explicit approvals set forth by users), etc.

The data store 102 can also include context data 106, which includes contexts that can be assigned to data in the search logs 104. For instance, a web page included in the search logs 104 can have at least one context assigned thereto. For example, such context can be based upon a label assigned to the web page by way of the Open Data Policy (ODP), based upon named entity recognition (NER), based upon information acquired from a wiki page, or the like. Further, queries in the search logs 104 can have at least one context assigned thereto. For instance, a context assigned to a query may be based upon a context assigned to a search result (e.g., web page) visited by a user who issued the query (e.g., wherein the search result satisfied the IR intent of the user).

The system 100 additionally includes a processor 108 and a memory 110 that is in communication with the processor 108. The memory 110 can include a rules generation system 112 and a rules analyzer system 114. Briefly, the rules generation system 112 is configured to generate content retrieval rules based upon the search logs 104 and the context data 106. The rules generation system 112 can cause these rules to be stored in the data store 102 as rules 116. The rules analyzer system 114 is configured to estimate the effectiveness of these rules 116 based upon the search logs 104 and the context data 106.

A brief explanation of the rules 116 and example of the rules 116 is now provided. Queries issued to a search engine are often unspecified or ambiguous. Often, context or background about an issuer of a query (a user) may provide information that disambiguates the information need of the user and can be used to automatically predict a more effective query (and thus, retrieval) for the user. A rule learned by the rules generation system 112 and included in the rules 116 can have the following format:

[CONTEXT] QUERY→QUERY REFORMULATION or CONTENT.

Exemplary content retrieval rules may accordingly be:
1) [Sports] bulls→Chicago Bulls; AND
2) [Sports] bulls→www.ChicagoBulls.com Rule 1) can be interpreted as follows: when the user has recently been viewing web pages about sports and issues the query "bulls", infer that the user actually intended for the query to be "Chicago Bulls". The second rule can be interpreted as follows: when the user has recently been clicking on web pages about sports and issues the query "bulls", retrieve the web page www.ChicagoBulls.com for the user. Given that the actual intent of the user is more accurately inferred, better results can be retrieved for the user. As will be described in greater detail herein, results about the altered query, the original query, or a blending of the two, can be retrieved and provided to the user.

It can therefore be ascertained that a content retrieval rule maps a combination of a context and a query to a reformulated query or content. The context is not intended to be limited to topical context for a search session. For example, the context may be, but is not limited to being, topical context of a particular search session, long-term topical context, short-term topical context, social indicators (e.g., self-identified groups on social sites to which the user belongs, schools attended by the user, content explicitly approved by the user, etc.), location of the user, location corresponding to content of web pages selected by the user, season (e.g., spring, summer, fall, winter), time-relative events, etc. The approach described herein pertaining to the content retrieval rules may be applicable to advertising, context-sensitive spelling correction, and alterations beyond adding words, as well as a variety of elements that may be included in a search engine result page (SERP) or whose triggering impacts the composition of the SERP, such as instant answers (triggering and ranking), entity pane related searches, user experience (UX) explanations, and multimedia verticals, such as images and video.

The rules analyzer system 114 is generally configured to estimate the effectiveness of a content retrieval rule generated by the rules generation system 112. For example, as will be described in greater detail herein, the rules analyzer system 114 can be configured to analyze a SERP generated based upon a triggered reformulated query, and to compute a value that is indicative of the quality of the SERP, and thus the quality of the triggered content retrieval rule. Subsequently, when a query is received and content retrieval rules that apply to the query are identified, the qualities of the content retrieval rules can be employed to rank the rules, such that, on average, the most effective content retrieval rules will be used responsive to receipt of queries.

While the rules generation system 112 and the rules analyzer system 114 are you illustrated as being included in the computing system 100, it is to be understood that the rules generation system 112 and the rules analyzer system 114 may be included in separate computing systems. For example, the rules generation system 112 may reside on a first computing system and can output a set of rules to a second computing system that includes the rules analyzer system 114.

With reference now to FIG. 2, a functional block diagram of the rules generation system 112 is illustrated. The rules generation system 112, as indicated above, has access to the search logs 104 and the context data 106. The rules generation system 112 includes a candidate rule identifier component 202 that is configured to generate candidate content retrieval rules. To that end, the candidate rule identifier component 202 can identify candidate ($Q_A$, $Q_B$) pairs (referred to herein as "query reformulation pairs"), where $Q_A$ is an initial query and $Q_B$ is a reformulation of the initial query. For each query reformulation pair, the candidate rule identifier component 202 can identify context(s) corresponding to $Q_A$ in the query reformulation pair.

There are multiple approaches contemplated for identifying candidate query reformulation pairs. For instance, the candidate rule identifier component 202 can utilize a discriminative method for identifying candidate query reformulation pairs. In another example, the candidate rule identifier component 202 can utilize a generative method for identifying candidate query reformulation pairs. When the candidate rule identifier component 202 utilizes a generative approach, a conditional probability distribution is used to identify candidate query reformulation pairs. Contrarily, when the candidate rule identifier component 202 utilizes a discriminative approach, a joint probability distribution is used to identify candidate query reformulation pairs.

Pursuant to an example, the rule identifier component 202 can identify a threshold number of most frequently received queries in the search logs 104 (e.g., the top 100 most common queries as computed from a sample from the search logs 104), the most popular 1000 queries (as computed from a sample of the search logs 104), etc.). The candidate rule identifier component 202 may then identify query reformulation pairs based upon the search logs 104, where a query reformulation pair includes one of the most frequently issued queries as the initial query ($Q_A$) and a corresponding reformulation ($Q_B$).

Figure 3:
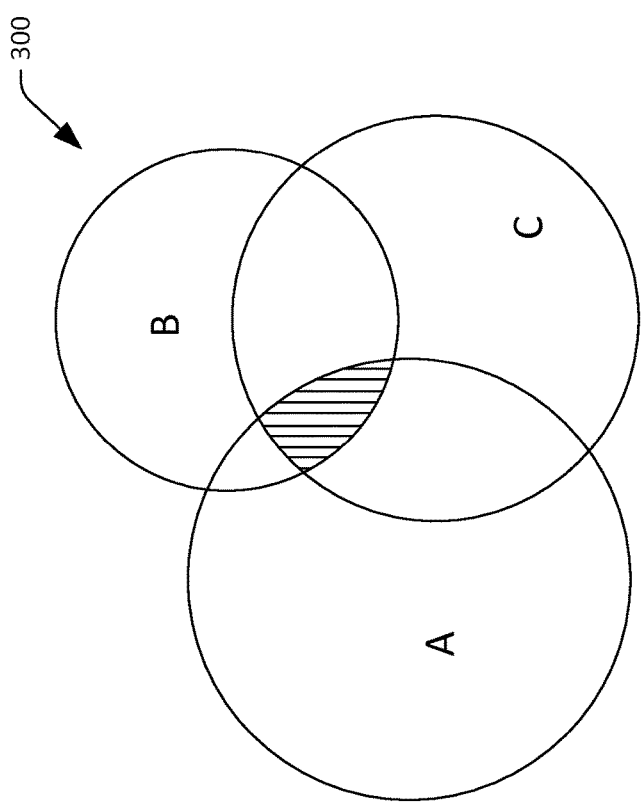
FIG. 3 depicts an exemplary Venn diagram that illustrates a discriminative approach for identifying candidate query reformulation pairs.

Additional detail with respect to an exemplary discriminative method for identifying candidate content retrieval rules is now set forth with respect to FIG. 3. FIG. 3 illustrates a Venn diagram 300, which graphically depicts a query space A, a query reformulation space B, and a category space C in the search logs 104. Generally, the candidate rule identifier component 202, when employing a discriminative method, identifies candidate reformulation pairs based upon the overlapping region between the query space A, the reformulation space B, and the category space C: P(A, B, C).

In an example, the candidate rule identifier component 202 can select a popular query $Q_A$ from the query space A, and $Q_A$ can be used as a seed query. The candidate rule identifier component 202 can identify expansions to $Q_A$ (from the reformulation space B) when $Q_A$ represents an ambiguous named entity, for example. These expansions can be obtained from various knowledge sources, such as wiki pages, the ODP, a dictionary that maps ambiguous terms to named entities, etc. In another example, the candidate rule identifier component 202 can identify a candidate reformulation pair based upon relationships between queries, such as term overlap between $Q_A$ and $Q_B$, or overlap in search results surfaced by a search engine for queries $Q_A$ and $Q_B$ within the same search session. In yet another example, the candidate rule identifier component 202 can exploit a subset relationship to identify a candidate reformulation pair. For instance, the candidate rule identifier component 202 can consider $Q_A$ and $Q_B$ to be a candidate reformulation pair when both queries occur in a single search session and $Q_B$ (issued after $Q_A$ in the search session) includes all of the terms of $Q_A$ plus one or more additional terms (e.g., and thus $Q_A$ and $Q_B$ are in the overlapping region of A, B, and C). The intuition behind this approach is that by using context, terms that the user added in order to improve their query may be predicted automatically. The result is a pair of candidate queries ($Q_A$, $Q_B$) in the overlap between the query space A, the reformulation space B, and the category space C, wherein the pair includes the earlier query $Q_A$ and the later query $Q_B$. The candidate rule identifier component 202 can consider ($Q_A$, $Q_A$) as a candidate pair as well. This type of self-reformulation may be useful for comparing and determining whether a query reformulation is likely to be more successful than keeping the initial query.

Figure 4:
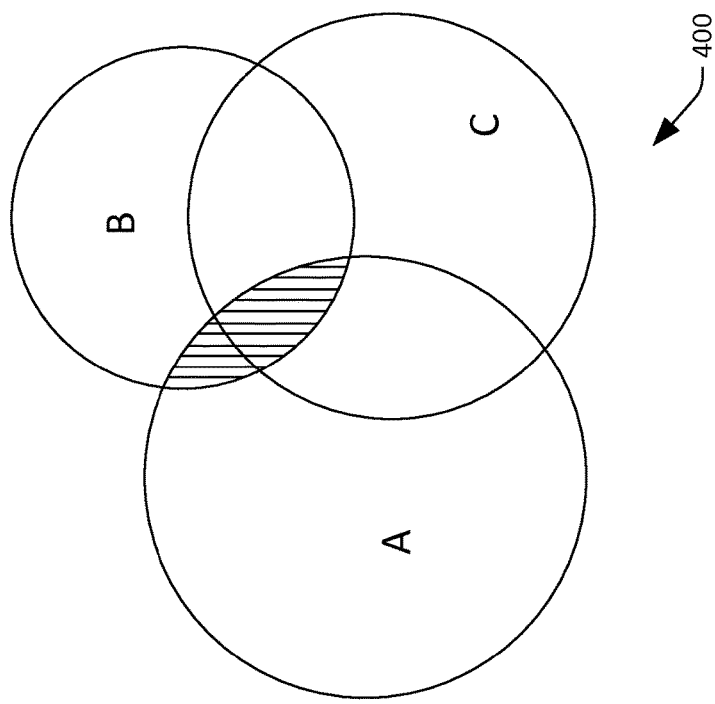
FIG. 4 depicts an exemplary Venn diagram that illustrates a generative approach for identifying candidate query reformulation pairs.

As indicated above, in another example, the candidate rule identifier component 202 can utilize a generative method to identify candidate reformation pairs based upon the search logs 104, which is generally presented in FIG. 4. FIG. 4 illustrates a Venn diagram 400 that depicts the query space A, the reformulation B, and the context space C. In the generative method, reformulation queries in the reformulation space B are identified based upon the condition of queries in the query space A having some category in the category space: P (B|A, C). For instance, as indicated previously, a query $Q_A$ in the search logs 104 can be assigned contextual (category) data in the category space C, where this data may be based upon contextual data (categories) assigned to search results retrieved by a search engine based upon the query. The candidate rule identifier component 202, given a ($Q_A$, C) pair, can be configured to predict the probability of reformulations of $Q_A$ that may be issued in parallel. For example, the candidate rule identifier component 202 can compute the probability that the user who issued query $Q_A$ will later issue query $Q_B$, given that ($Q_A$, C) have been observed.

In another example, the candidate rule identifier component 204 can identify or rank candidate reformulation pairs according to their mutual information. In this case, the mutual information between A, B, and C can be defined as follows:

$$I(A; B; C) = \sum_{c \in C} \sum_{b \in B} \sum_{a \in A} p(a, b, c) \log\left(\frac{p(a, b, c)}{p(a)p(b)p(c)}\right),$$

where p(a, b, c) is the joint probability distribution function of A, B, and C, and p(a), p(b), and p(c) are the marginal probability distribution functions of A, B, and C, respectively.

Responsive to identifying the candidate query reformulation pairs (using a generative or discriminative approach), the candidate rule identifier component 202, for each identified candidate reformulation pair, can generate a set of contexts available at the point where query $Q_A$ was issued. Exemplary contexts include, but are not limited to: 1) an empty context; 2) top class—this refers to the most frequent topic (category) of clicked search results in the search session up to the point when query $Q_A$ was issued; 3) in top N class—this context represents that the topic (category) is one of the top N topics of clicked search results in the search session up to the point where query $Q_A$ was issued; 4) confidence class is greater than a threshold—this context reflects when the confidence of the topic (category) of clicked search results in the search session up to the point where query $Q_A$ was issued exceeds the (specified) threshold. Other contexts that can be assigned to a query reformulation pair by the candidate rule identifier component 202 include: location (city, state, country, etc. as context); address-based (e.g., a portion of a network address of the computing device employed by the user is included as context); social context (entities that a user has "liked" can be used as context); long-term topical interest, which is similar to the search session topical context but over a longer range of interactions of the user (e.g. several weeks of search and click behavior, rather than over a search session); previous queries issued by the user (over a multitude of time ranges), or other search session topic representations. In this case, topics of the queries or all returned documents in the search engine can be used as context, rather than only the clicked documents. Once the candidate rule identifier component 202 assigns a context to the query reformulation pair, a content retrieval rule is generated. Using the exemplary approaches set forth above, the candidate rule identifier component 202 can automatically generate a plurality of content retrieval rules based upon the search logs 104.

Further, in an example, the candidate rule identifier component 202 can assign confidences to the contexts at the point where query $Q_A$ was issued. For example, based upon user attributes, documents selected during a search session, etc., the candidate rule identifier component 202 can assign confidence scores to contexts assigned to a query reformulation pair—thus, the query reformulation pair may have multiple contexts assigned thereto, each with its own confidence value.

The rules generation system 112 also includes a score assignor component 204 that can be configured to assign a respective score to each content retrieval rule output by the candidate rule identifier component 202. A score assigned to a content retrieval rule can be indicative of effectiveness of the rule when executed and can be based upon content of the search logs 104. For instance, a rule can be considered to be effective if the query alteration leads the user to a relevant document. For example, in the search logs 104, a relevant document can be defined as a search result that was dwelled upon by the user for some threshold amount of time or a search result that completed a search session (e.g., the user ceases to interact with the search engine upon reviewing the search result). To generate the effectiveness score, the score assignor component 204 can analyze the search logs 104 and aggregate search sessions where the rule being analyzed was observed (e.g., the matching query and context is observed, followed by the user issuing the query alteration). The score assignor component 204 can count a number of times that the rule was observed, as well as a number of times that the rule was found to be effective.

The score assignor component 204 can use such counts to rank the rules for a given query in terms of average effectiveness of the rules. For example, the score assignor component 204 can rank the rules based upon average effectiveness assigned thereto. Other approaches are also contemplated, however, such as an upper bound on the effectiveness, which may be useful for deciding whether a rule may be effective, but has not been observed often. Accordingly, the score assignor component 204 can output, for each query—context combination, a ranked list of content retrieval rules.

The rules generation system 112 may optionally include a pruner component 206 that can filter one or more content retrieval rules to increase precision of a final rule set output by the rules generation system 112, and thereby restricting output rules to only contextual rewrites. Filters that can be employed by the pruner component 206 when pruning the rules include, but are not limited to: 1) removing rules not observed a sufficient number of times in the search logs 104 (e.g., the pruner component 206 can ensure that only content retrieval rules that were observed a threshold number of times in the search logs 104 are retained); 2) removing candidate rules whose success rate in the search logs 104 was not higher than the success rate observed when the original query was issued; 3) removing candidate rules whose success rate in the search logs 104 was not higher than the context-dependent self-reformulation; 4) removing candidate rules whose success rate in the search logs 104 was not higher than $Q_B$ being issued in a context-independent manner; 5) removing candidate content retrieval rules where the success rate corresponding to $Q_B$ is not higher than the success rate corresponding to $Q_A$ by some threshold; 6) removing candidate rules where the contextual reformulation ($Q_B$) occurs less than some percentage of the time that query $Q_A$ occurs and 7) removing rules where their predicted search performance (quality) is expected to be low (this can also be done online during retrieval: that is, results returned from the reformulation can be ignored if they are estimated to have low quality).

In yet another example, ambiguous queries can be identified separately, and thereafter the rules generation system 112 can learn query reformulation rules. For example, the rules generation system 112 can include a classifier that is trained to label a query as being ambiguous or unambiguous. For instance, the classifier can be provided with the N most frequently occurring queries in the search logs 104, and can identify a subset of those queries that are identified as being ambiguous by the classifier. Thereafter, the rules generation system 112 can generate content retrieval rules using techniques set forth above.

Figure 5:
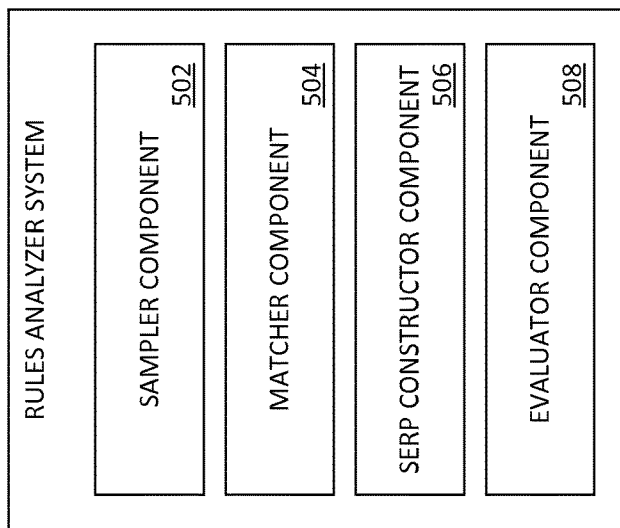
FIG. 5 is a functional block diagram of a rules analyzer system that is configured to estimate effectiveness of respective content retrieval rules based upon search engine logs.

Referring now to FIG. 5, a functional block diagram of the rules analyzer system 114 is illustrated. The rules analyzer system 114 includes a sampler component 502 that can access the search logs 104 and extract search sessions therefrom. As indicated previously, a search session is defined by a sequence of continuous user activity with respect to the search engine. A matcher component 504 receives the search session identified by the sampler component 502 and identifies at least one content retrieval rule from the content retrieval rules output by the rules generation system 112. The rules analyzer system 114 also includes a search engine results page (SERP) constructor component 506, which constructs a $SERP_A$ based upon $Q_A$ in the search logs, and further constructs at least one $SERP_B$ triggered by the identified content retrieval rule. The SERP constructor component 506 can further construct a hypothetical $SERP_F$ that includes a ranked list of search results, which may be a blending of search results in $SERP_A$ and $SERP_B$. Additionally, the SERP constructor component 506 can include advertisements, an instant answer, an entity card, etc. in $SERP_F$.

The rules analyzer system 114 also includes an evaluator component 508 that can receive $SERP_F$, as well as at least $SERP_A$ provided to the user of the search session when the user issued the query $Q_A$. The evaluator component 508 can output a score that is indicative of effectiveness of a rule set based upon interactions of the user as identified in the search session in the search logs 104. For example, if $SERP_F$ includes a search result that was not included in $SERP_A$, but after the user set forth query reformulation was selected by the user in the search log, the $SERP_F$ can be assigned a score that indicates an improvement over $SERP_A$. A variety of techniques can be employed by the evaluator component 508 to assign a score that is indicative of improvement of $SERP_F$ over t $SERP_A$ that was provided to the user.

Figure 6:
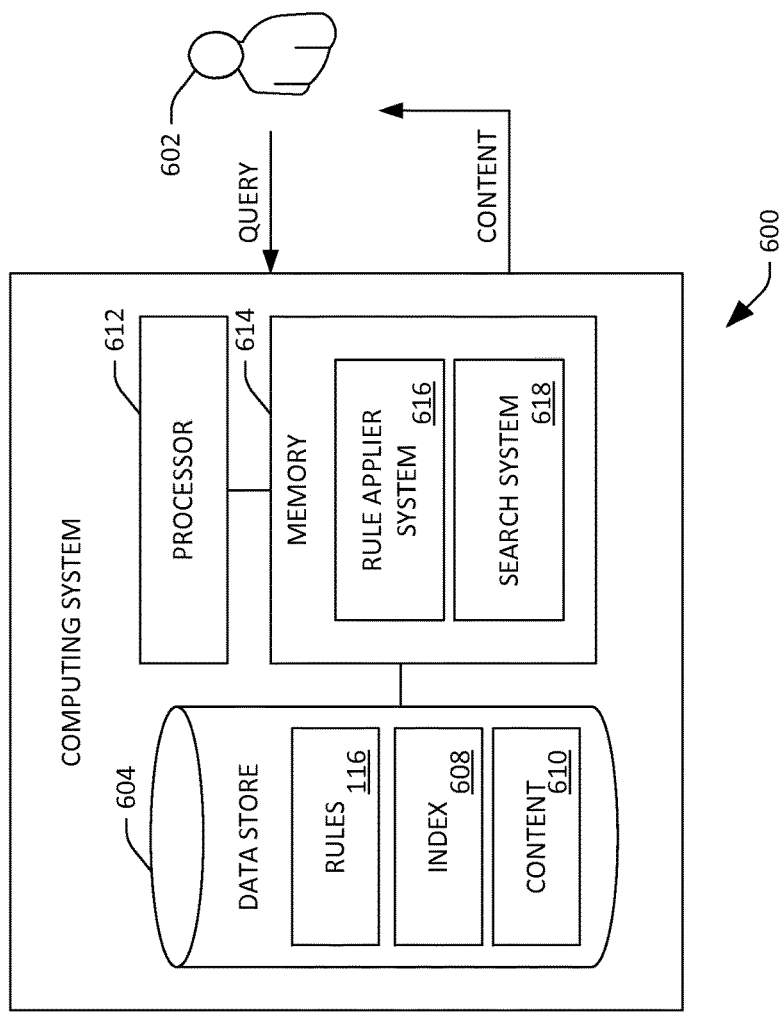
FIG. 6 is a functional block diagram of an exemplary computing system that is configured to identify an applicable content retrieval rule responsive to receipt of a query.

With reference now to FIG. 6, an exemplary computing system 600 that is configured to provide content to a user 602 through application of a content retrieval rule is illustrated. The computing system 600, for example, may be included in or used to instantiate a search engine. Therefore, for instance, the computing system 600 may be an enterprise computing system, a data center (e.g., a private data center), etc. The computing system 600 includes a data store 604, wherein the data store 604 comprises the rules 116 generated by the rules generation system 112. Again, the format of the rules can be [C] $Q_A \rightarrow Q_B$ or content. For example, rather than the content retrieval rule pointing to a query reformulation, it can be understood that the rules generation system 112 can be configured to identify particular content based upon an issued query and context (e.g., a web page that is typically visited). The data store 604 can also include a searchable index 608, such as an index of web pages accessible by way of the World Wide Web. The data store 604 can further include content 610 that may be directly provided to the user 602, such as instant answers, entity cards, individual web pages, etc.

The computing system 600 additionally includes a processor 612 and a memory 614 that comprises systems and components that are executed by the processor 612. While the computing system 600 is illustrated as being separate from the computing system 100, it is to be understood that the computing systems 100 and 600 may be included in the same computing system.

The memory 614 includes a rule applier system 616 that is configured to identify a content retrieval rule responsive to receipt of a query from the user 602. The rule applier system 616 is further configured to execute the identified rule. The memory 614 can also include a search system 618 that is in communication with the rule applier system 616. The search system 618, in an example, can receive a query reformulation (and the original query) and can execute a search over the index 608 based upon the query and/or the query reformulation. Alternatively, the search system 618 can cause content from the content 610 to be provided to the user 602 based upon the content retrieval rule.

With still more particularity, the user 602 can issue a query for the search system 618. The rule applier system 616 can receive the query and assign one or more contexts to the received query. As indicated above, this context can be based upon web pages visited by the user 602 during a search session that includes the query, web pages generally viewed by the user over time (outside of a search session), interactions of the user 602 in a social media application, previous queries issued by the user 602, etc. It is to be understood that, in an example, that the information employed by the rule applier system 616 to assign a context to the query can be explicitly approved for such use by the user 602. Further, the rule applier system 602 can assign multiple contexts to the query, with the contexts having confidence scores assigned thereto. For instance, the rule applier system 602 can assign a probability of 0.8 to the query that the context is "sports."

Responsive to identifying contexts that can be assigned to the query, the rule applier system 616 searches the rules 116 for at least one content retrieval rule that is triggered based upon the query and the contexts. When multiple rules can be triggered, the rule applier system 616 can select some threshold number of rules with the highest effectiveness scores assigned thereto. That is, the rule applier system 616 can identify some threshold number of most highly ranked rules from the rules 116 that apply, given the query and the contexts assigned to the query. Once the rule has been identified, the rule applier system 616 can execute the rule, which may include transmitting the reformulated query identified in the rule (and optionally the original query) to the search system 618. The search system 618 may then deliver content to the user 602 (cause content to be displayed on a display of a computing device employed by the user 602) based upon the query reformulation. Execution of the rule is also intended to encompass deferred content retrieval—for example, execution of the rule can result in a query being presented as a query suggestion, which may be selected by the user to retrieve content.

Figure 7:
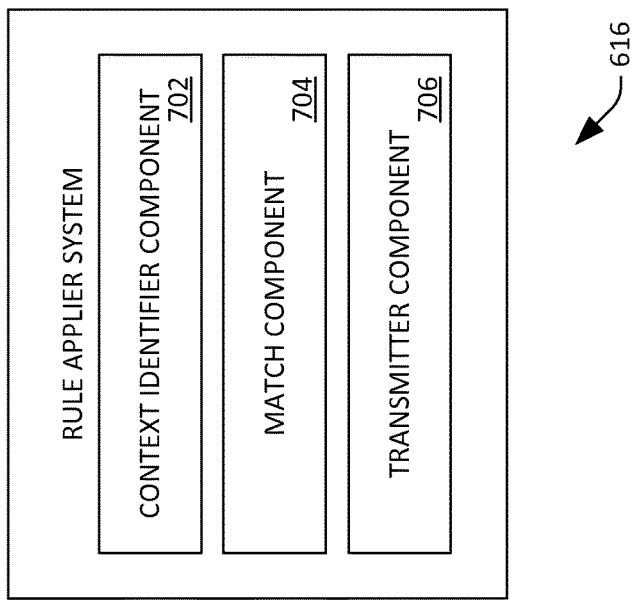
FIG. 7 is a functional block diagram of an exemplary rule applier system that is configured to assign a context to a received query and identify a content retrieval rule based upon the query and the assigned context.

With reference now to FIG. 7, a functional block diagram of the rule applier system 616 is illustrated. As indicated previously, the rule applier system 616 receives a potentially ambiguous query. The rule applier system 616 includes a context identifier component 702 that is configured to assign a context to the query responsive to receipt of such query. In an example, the context identifier component 702 can assign the context to the query based upon observations about the user 602. For instance, the observations about the user 602 can include observations about a search session in which the query is issued (e.g., search results selected by the user or search results not selected by the user), observations over a longer time (e.g., a week), observations about a still longer time (e.g., three months to six months), etc. The observations can further include, but are not limited to, queries previously issued by the user 602, web pages visited by the user 602, interaction of the user with respect to social networking webpages (e.g., entities "liked" by the user), etc. Moreover, the observations about the user 602 can include attributes of the user, such as demographic information about the user 602 (e.g., age, gender, ethnicity, . . . ), height of the user 602, hair color of the user 602, and so forth. Still further, the observations can include location of the user 602, a network address of the computing device of the user 602, time of day, day of week, season, and the like.

A match component 704 can receive the query and the context assigned to the query from the context identifier component 702, and can identify a rule in the rules 606 that is mapped to the combination of the query and the context. In some cases, more than one context can be assigned to the query, which may result in identification of more than one rule in the rules 606.

The rule applier system 616 can also include a transmitter component 706 that, for example, transmits the identified rules to the search system 618. Additionally or alternatively, the transmitter component 706 can be configured to rank rules output by the match component 704. As indicated previously, rules may have effectiveness scores assigned thereto, and the transmitter component 706 can rank rules based upon their respective effectiveness scores. The search system 618 may then execute a search based upon at least upon the most highly ranked rule in the rules.

Figure 8:
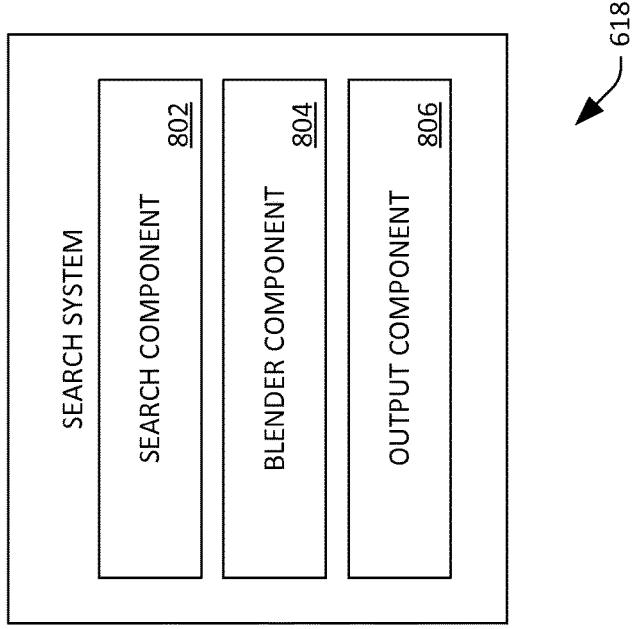
FIG. 8 is a functional block diagram of an exemplary search system that is configured to execute a search based upon a content retrieval rule.

Referring to FIG. 8, a functional block diagram of the search system 618 is illustrated. The search system 618 includes a search component 802 that receives the query set forth by the user 602 and a reformulated query identified by the content retrieval rule. Accordingly, the search component 802 can execute at least two searches, a search based upon the original query issued by the user 602 and another search based upon the reformulated query identified by the rule applier system 616.

The search system 618 can further include a blender component 804 that can receive a set of search results based upon the search and another set of search results based upon the another search, and generates a SERP that includes at least one search result in the set of search results and at least one search result in the another set of search results. Thus, the blender component 804 can blend search results retrieved based upon different queries. The blender component 804 can utilize any suitable technique when performing such blending. For instance, the search results may have relevance scores respectively assigned thereto for the query. The blender component 804 can blend search results from the two sets of search results based upon the respective relevance scores assigned to search results in the two sets of search results.

In another example, the blender component 804 can cause a computer-implemented advertisement to be presented on the SERP based upon the reformulated query. Such advertisement may include an advertisement displayed in the sidebar, a banner advertisement, etc. In yet another example, the blender component 804 can cause an entity card to be displayed on the SERP based upon the reformulated query. An entity card can includes information about an entity that can be displayed in the SERP. For example, an entity can be a person, place, or thing, and the entity card can display attributes of the person, place, or thing. In yet another example, when the reformulated query pertains to a location, the blender component 804 can cause a map of the location to be presented on the SERP. In an example, when the original query is "bulls" and the reformulated query is "Chicago Bulls", the blender component 804 can cause a map of Chicago to be presented on the SERP. Still further, the blender component 804 can cause an instant answer to be presented on the SERP based upon the reformulated query. In yet another example, the blender component 804 can cause key words in the reformulated query (but not in the original query) to be highlighted in search results shown on the search results page, thereby providing the user with a visual indication of the reformulated query. Still further, the blender component 804 can display the reformulated query as a suggested query, wherein upon the user selecting the reformulated query, the search component 802 can execute a search based solely upon the reformulated query.

The search system 618 additionally includes an output component 806 that causes the SERP generated by the blender component 804 to be presented on a display of a computing device employed by the user 602.

Figure 9:
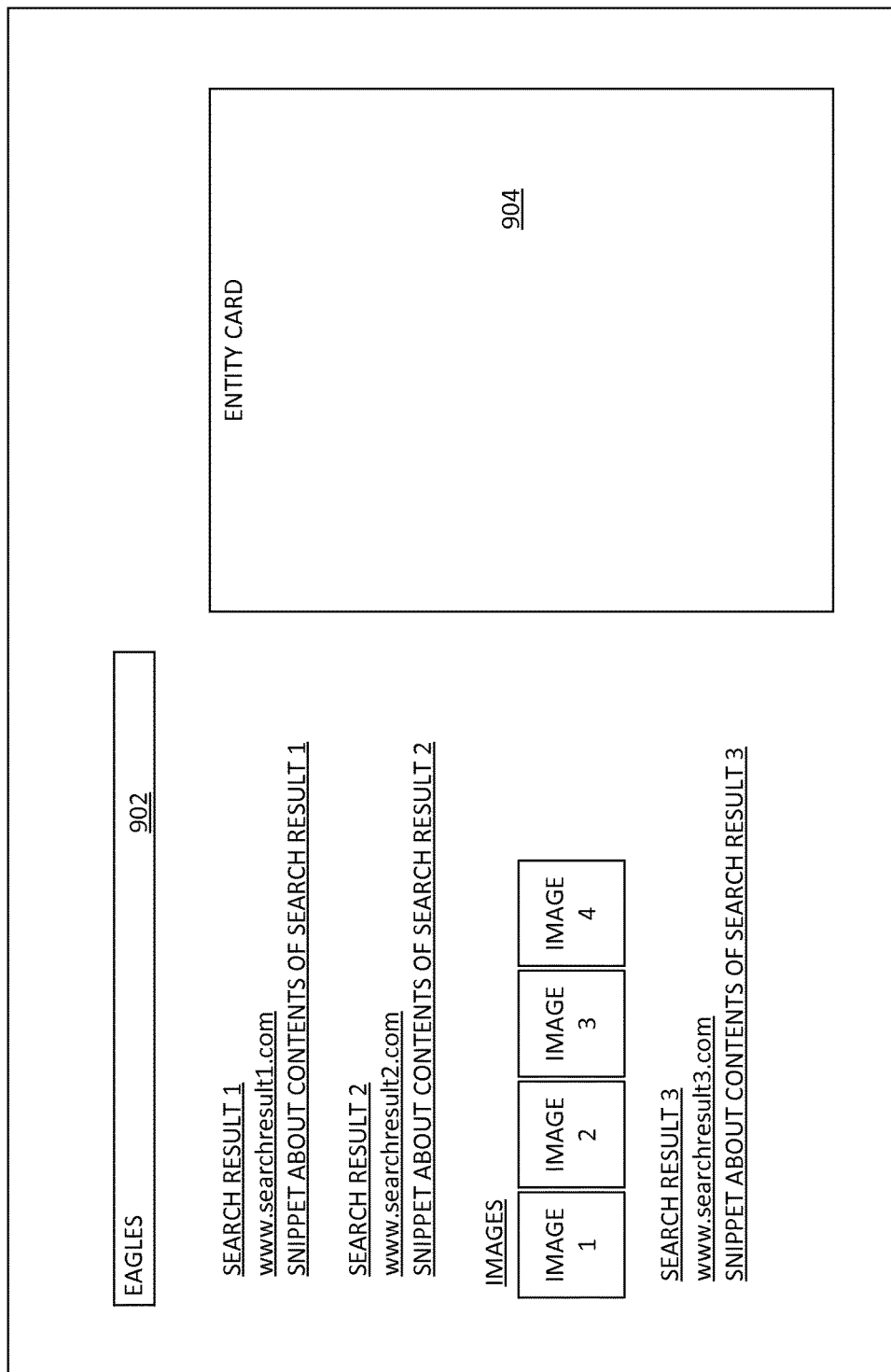
FIG. 9 is an exemplary graphical user interface that depicts a search engine results page (SERP), wherein the SERP comprises search results retrieved based upon a content retrieval rule.

With reference now to FIG. 9, an exemplary graphical user interface 900 of a SERP that can be generated by the blender component 804 and output by the output component 806 is illustrated. The graphical user interface 900 includes a query field 902. As can be ascertained, a user has set forth the original query "eagles" into the search field 902. In the example depicted in the graphical user interface 900, the context assigned to the query "eagles" is "top-N sports", and the content retrieval rule that the maps the combination of "eagles" and the context "top-N sports" to the reformulated query "Philadelphia Eagles" is identified. The search component 802 can execute two searches: a search based upon the query "eagles" and another search based upon the query "Philadelphia Eagles." The blender component 804 blends the search results, and the output component 806 outputs the SERP shown in the graphical user interface 900. In this example, the SERP includes an entity card 904 for the entity Philadelphia Eagles. The entity card 904 includes attributes about the Philadelphia Eagles including, for example, current players, stadium, date of founding, coach, etc. The SERP also includes several search results. The search results may include a search result that is highly relevant to the reformulated query near the top of the search results in the SERP. Other search results, however, may be based upon the more ambiguous query "eagles." For instance, one of the search result in the SERP may relate to the band, The Eagles.

Figure 10:
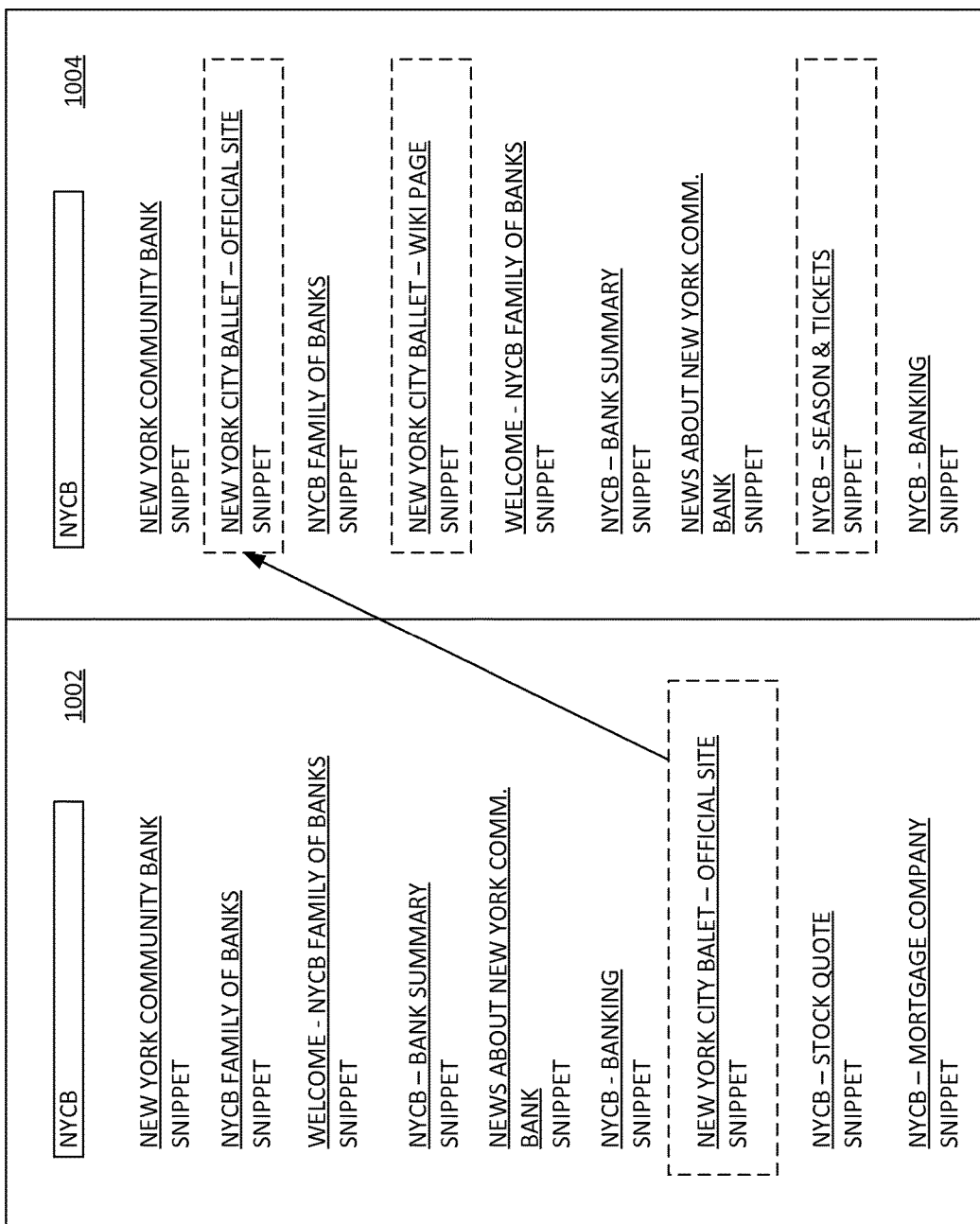
FIG. 10 is an exemplary graphical user interface that depicts a pair of SERPs for purposes of comparison.

Now referring to FIG. 10, a pair of graphical user interfaces 1002 and 1004 is illustrated. The first graphical user interface 1002 depicts a SERP that includes search results based upon the query "nycb," which may be somewhat ambiguous. For instance, the query can be an acronym that may describe the New York Community Bank, a stock ticker for the New York Community Bank, the New York Community Bank mortgage company, the New York City Ballet, etc. The query "nycb", however, may have been set forth in a particular context—e.g., the user who issued the query has been viewing web pages related to the arts. The combination of "nycb" and the context can trigger a content retrieval rule, which includes the query "New York City Ballet." The SERP shown in the graphical user interface 1004 is the SERP output by the blender component 804 which includes search results both for the query "nycb" and the reformulated query "New York City Ballet." As can be determined by comparing the SERP shown the graphical user interface 1002 with the SERP shown in the graphical user interface 1004, the graphical user interface 1004 depicts several search results that relate to the New York City Ballet, while the graphical user interface 1002 includes a single search result related to the New York City Ballet (and ranked relatively low in the search results). Effectively, then, the issuer of the query is more likely provided with search results that are of interest to the user without requiring that the user actually reformulate her query.

Figure 11:
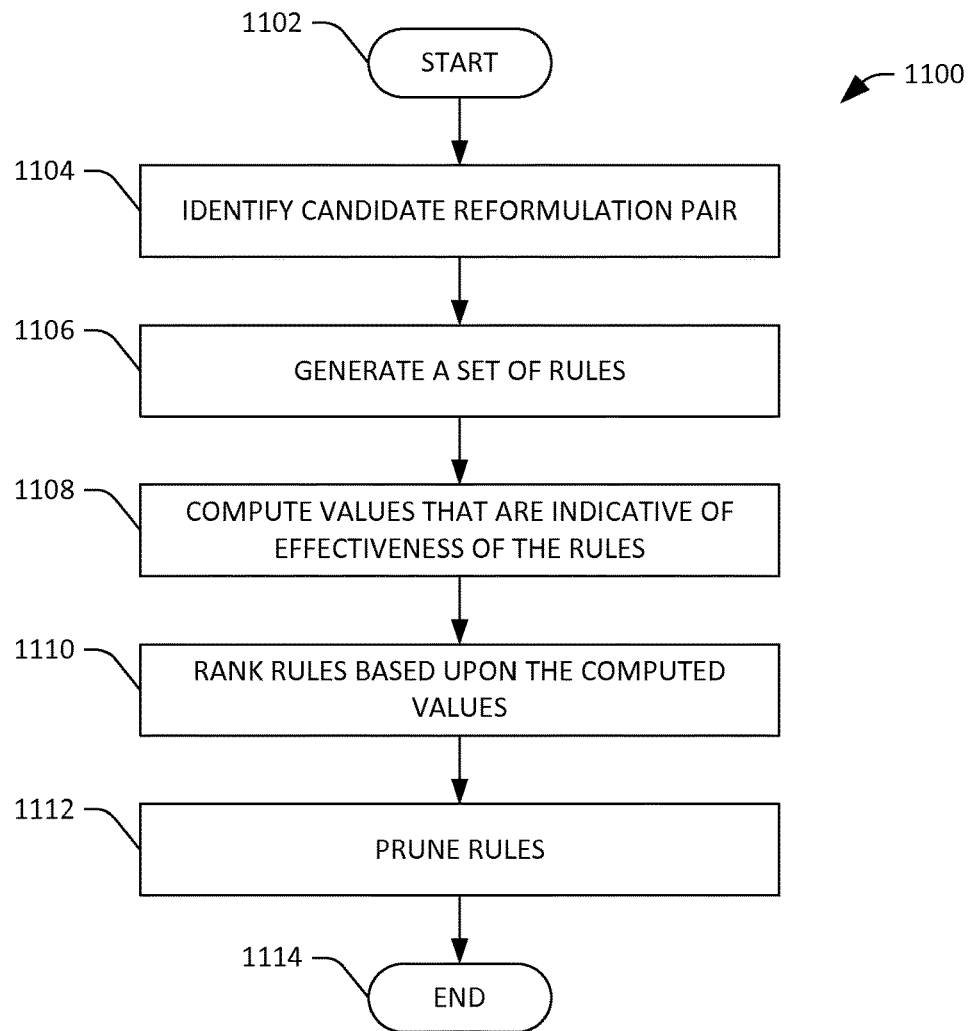
FIG. 11 is a flow diagram that illustrates an exemplary methodology for generating content retrieval rules.
Figure 12:
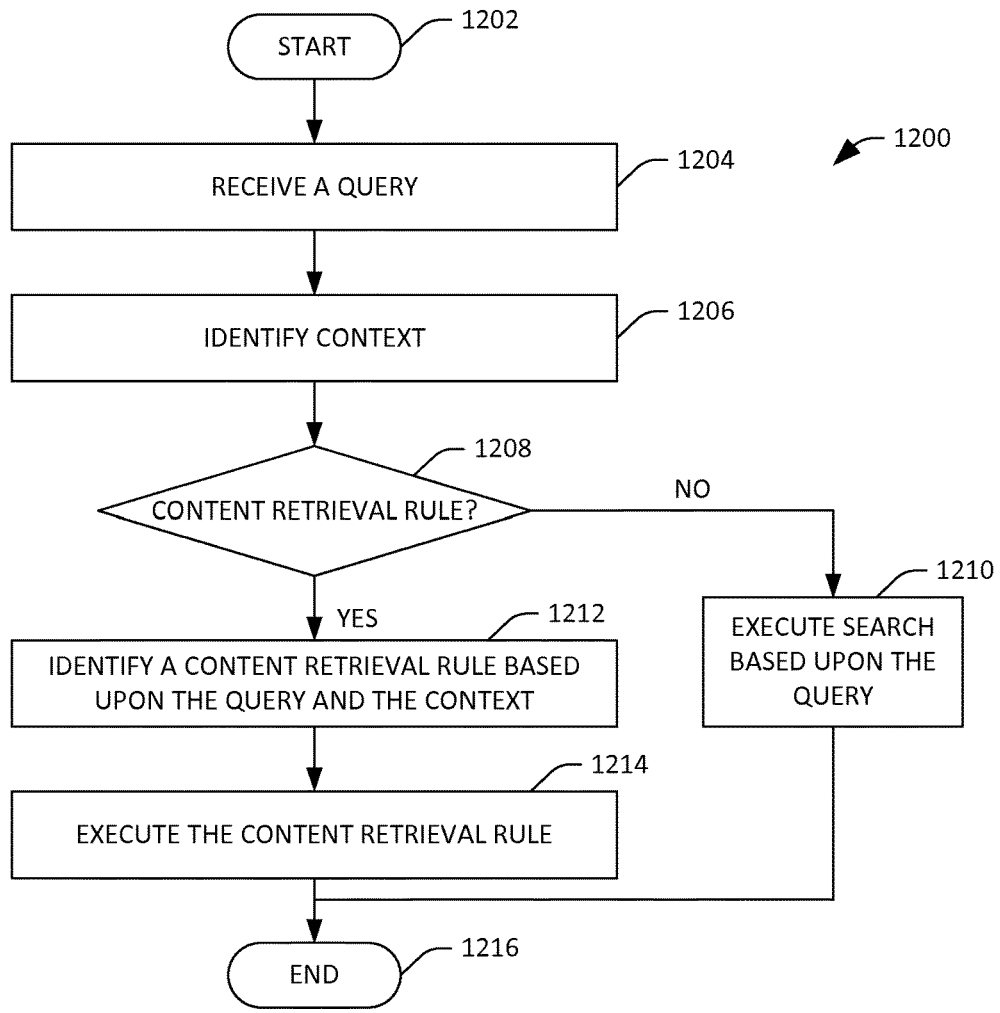
FIG. 12 is a flow diagram illustrating an exemplary methodology for identifying and executing a content retrieval rule.
Figure 13:
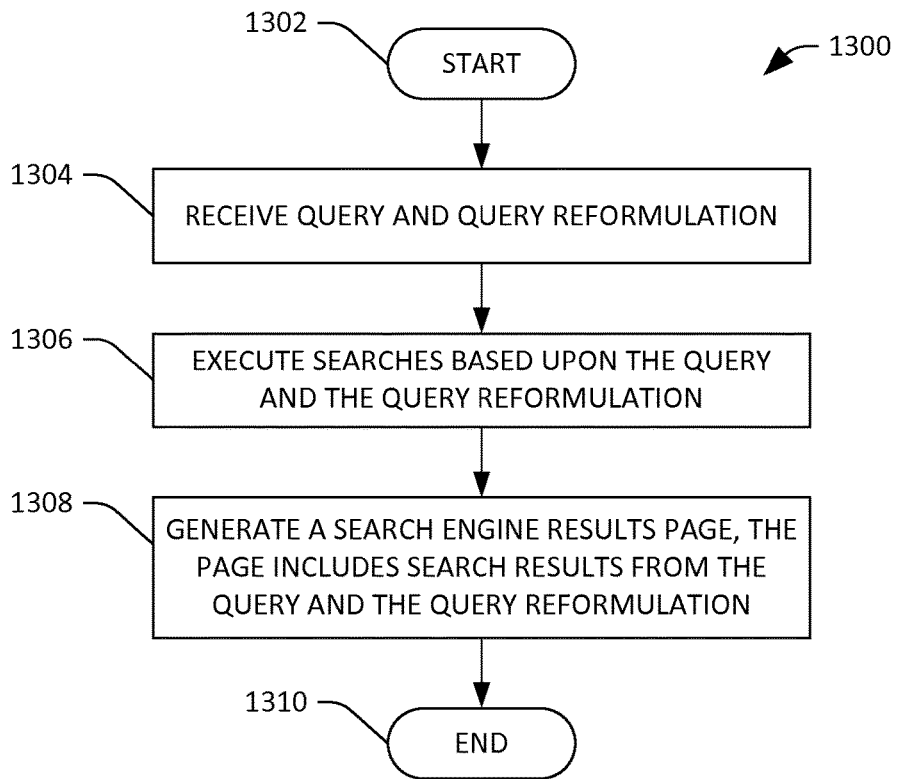
FIG. 13 is a flow diagram that illustrates an exemplary methodology for generating a SERP based upon a received query and a reformulation of the query.

FIGS. 11-13 illustrate exemplary methodologies relating to content retrieval rules. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 11, an exemplary methodology 1100 for outputting content retrieval rules is illustrated. The methodology 1100 starts at 1102, and at 1104, candidate reformulation pairs are identified. The candidate reformulation pairs can be identified using the any of the techniques discussed above with reference to the candidate rule identifier component 202. For example, generative methods and discriminative methods can be used for learning query reformulations from search log data.

At 1106, a set of content retrieval rules is generated for each query reformulation pair. Exemplary techniques for generating a set of rules have been described above with respect to the candidate rule identifier component 202.

At 1108, values that are indicative of effectiveness of the rules can be computed. Pursuant to an example, multi-armed bandit approaches can be used to provide a ranking of proposed content retrieval rules either by an effectiveness score or by an upper bound on the effectiveness score. At 1110, the rules are ranked based upon the values computed at 1108, and at 1112, the content retrieval rules are optionally pruned. For instance, the rules can be pruned as described above with respect to the pruner component 206. The methodology 1100 completes at 1114.

Now referring to FIG. 12, an exemplary methodology 1200 that facilitates executing a content retrieval rule is illustrated. The methodology 1200 starts 1202, and at 1204, a query is received. At 1206, a context for the query is identified. At 1208, a determination is made as to whether the query and the context map to a content retrieval rule. If there is no content retrieval rule for the combination of the query and the context, then the methodology 1200 proceeds to 1210, where the search is executed based upon the query received 1204. If, at 1208, it is determined that a content retrieval rule maps to the query received at 1204 and the context identified at 1206, then at 1212 a content retrieval rule is identified based upon the query and the context. The content retrieval rule can, for example, identify a query reformulation, which can be transmitted to the search system. At 1214, the query reformulation identified in the content retrieval rule is transmitted to the search engine, which executes a search based upon the query received 1204 and the query reformulation. The methodology 1200 completes at 1216.

Now referring to FIG. 13, an exemplary methodology 1300 that facilitates generation of a SERP based upon a content retrieval rule is illustrated. The methodology 1300 starts at 1302, and at 1304, a query and query reformulation are received. The query reformulation has been identified based upon a content retrieval rule that maps the combination of the query and its context to the reformulated query. At 1306, searches are executed based upon the query and the query reformulation, respectively. At 1308, a SERP is generated, which includes search results based upon the query and search results based upon the query reformulation. That is, the SERP includes a blend of search results from two separate searches. The methodology 1200 completes at 1210.

Various example are now set forth.

EXAMPLE 1

A computing system comprising: a processor; and a memory that comprises a rule applier system that is executed by the processor, the rule applier system configured to: assign a context to a query responsive to receiving the query; identify a content retrieval rule based upon the query and the context assigned to the query, the content retrieval rule maps a combination of the query and the context to one of content or a query reformulation; and execute the content retrieval rule responsive to identifying the content retrieval rule.

EXAMPLE 2

The computing system according to example 1, the content retrieval rule maps the combination of the query and the context to the reformulated query, the rule applier system configured to transmit the reformulated query to a search system that executes the reformulated query over an index.

EXAMPLE 3

The computing system according to any of examples 1-2, the search system executes both the query and the reformulated query, and wherein the search system is configured to return a search engine results page, the search engine results page comprises content retrieved by the search system based upon the query and the reformulated query.

EXAMPLE 4

The computing system according to example 3, the content comprising search results retrieved by the search system based upon the query and other search results retrieved by the search system based upon the reformulated query.

EXAMPLE 5

The computing system according to example 3, the content comprising at least one of a map, an entity card, or an advertisement that is retrieved by the search system based upon the reformulated query.

EXAMPLE 6

The computing system according to example 1, the content retrieval rule maps the combination of the query and the context to the content, the content being a web page.

EXAMPLE 7

The computing system according to example 1, wherein the rule applier system comprises a context identifier component that assigns the context to the query based upon observations about a user who issued the query.

EXAMPLE 8

The computing system according to example 7, the context identifier component assigns the context for a current search session.

EXAMPLE 9

The computing system according to example 7, the observations about the user further comprise at least one of an interaction with a social networking application, a previous query issued by the user, or a network address of a computing device of the user.

EXAMPLE 10

The computing system according to any of examples 1-9, the memory further comprising a rules generator system that generates a plurality of content retrieval rules based upon search logs of a search engine, the plurality of content retrieval rules comprise the content retrieval rule.

EXAMPLE 11

The computing system according to example 10, the rules generator system comprises a score assignor component that assigns respective scores to the plurality of content retrieval rules, where the content retrieval rule is assigned to the query based upon a score assigned to the content retrieval rule.

EXAMPLE 12

A method comprising: assigning a context to a received query based upon observations about an issuer of the query; identifying a content retrieval rule based upon the query and the context assigned to the query, the content retrieval rule maps a combination of the query and the context to one of a query reformulation or content; and responsive to identifying the content retrieval rule, executing the content retrieval rule.

EXAMPLE 13

The method according to example 12, the content retrieval rule maps the combination of the query and the context to the query reformulation, the method further comprising: executing a search based upon the query; and executing another search based upon the query reformulation.

EXAMPLE 14

The method according to example 13, further comprising: outputting a search engine results page based upon the search and the another search, the search engine results page includes a search result retrieved in the search and another search result retrieved in the another search.

EXAMPLE 15

The method according to example 14, further comprising: highlighting a keyword of the reformulated query in the another search result, the query free of the highlighted keyword.

EXAMPLE 16

The method according to example 12, the content retrieval rule maps the combination of the query and the context to the query reformulation, the method further comprising: executing a search based upon the query; generating a search engine results page based upon the query; and presenting the query reformulation on the search engine results page as a suggested query.

EXAMPLE 17

The method according to example 12, the content retrieval rule maps the combination of the query and the context to the content, and wherein executing the content retrieval rule comprises causing the content to be displayed on a display to the issuer of the query.

EXAMPLE 18

The method according to any of examples 12-17, wherein the observations about the issuer of the query comprise demographics of the issuer of the query.

EXAMPLE 19

The method according to any of examples 12-18, wherein the observations about the issuer of the query comprise previous queries set forth by the issuer of the query and search results selected or not selected by the issuer of the query.

EXAMPLE 20

A computer-readable storage medium comprising instructions that, when executed by a processor, cause the processor to perform acts comprising: identifying a content retrieval rule based upon a query and a context assigned to the query, the context indicative of a topic historically observed to be of interest to an issuer of the query; identifying a predefined mapping between a combination of the query and the context to a reformulation of the query; and responsive to identifying the predefined mapping, causing content to be presented on a display based upon the reformulation of the query.

EXAMPLE 21

A system comprising means for assigning a context to a received query based upon observations about an issuer of the query; means for identifying a content retrieval rule based upon the query and the context assigned to the query, the content retrieval rule maps a combination of the query and the context to one of a query reformulation or content; and means for executing the content retrieval rule.

Figure 14:
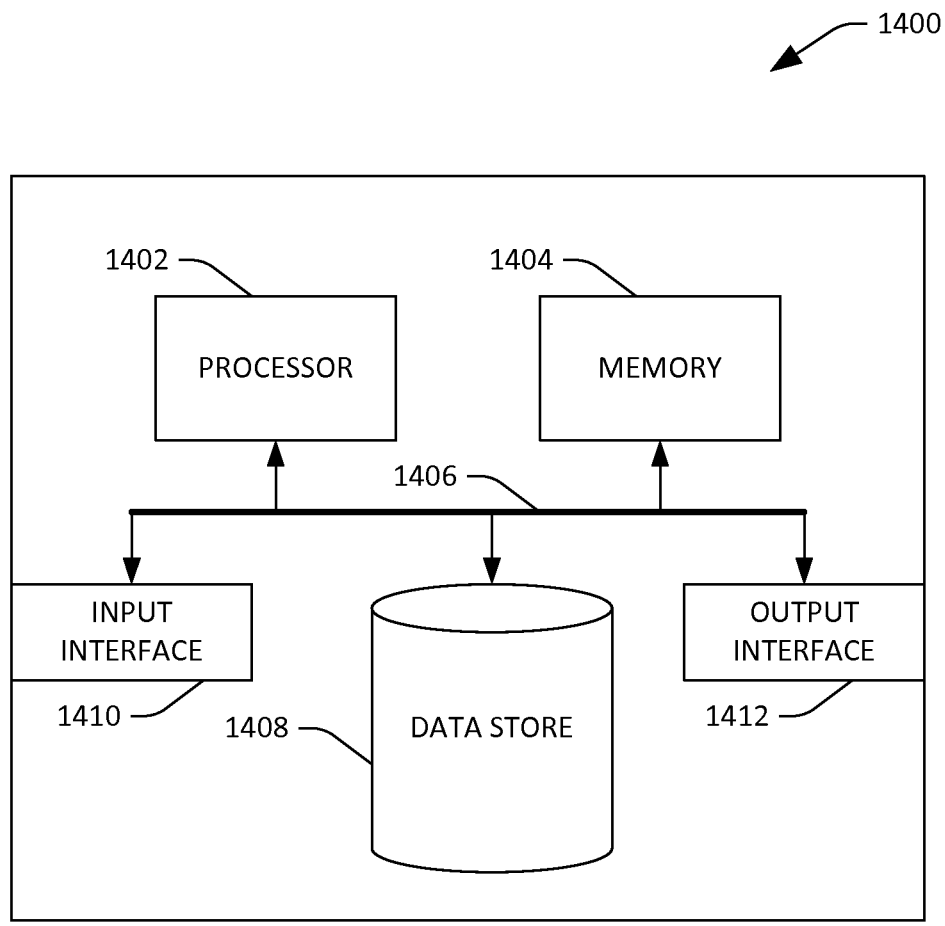
FIG. 14 is an exemplary computing system.

Referring now to FIG. 14, a high-level illustration of an exemplary computing device 1400 that can be used in accordance with the systems and methodologies disclosed herein is illustrated. For instance, the computing device 1400 may be used in a system that supports generating content retrieval rules. By way of another example, the computing device 1400 can be used in a system that supports application of content retrieval rules. The computing device 1400 includes at least one processor 1402 that executes instructions that are stored in a memory 1404. The instructions may be, for instance, instructions for implementing functionality described as being carried out by one or more components discussed above or instructions for implementing one or more of the methods described above. The processor 1402 may access the memory 1404 by way of a system bus 1406. In addition to storing executable instructions, the memory 1404 may also store an index, content retrieval rules, content, etc.

The computing device 1400 additionally includes a data store 1408 that is accessible by the processor 1402 by way of the system bus 1406. The data store 1408 may include executable instructions, content retrieval rules, an index, content, etc. The computing device 1400 also includes an input interface 1410 that allows external devices to communicate with the computing device 1400. For instance, the input interface 1410 may be used to receive instructions from an external computer device, from a user, etc. The computing device 1400 also includes an output interface 1412 that interfaces the computing device 1400 with one or more external devices. For example, the computing device 1400 may display text, images, etc. by way of the output interface 1412.

It is contemplated that the external devices that communicate with the computing device 1400 via the input interface 1410 and the output interface 1412 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1400 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1400 may be a distributed system. Thus, for instance, several devices may be in communication by way of a network connection and may collectively perform tasks described as being performed by the computing device 1400.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system comprising:
   a processor; and
   memory that comprises instructions that, when executed by the processor, cause the processor to perform acts comprising:
   during a search session with a search engine, receiving a query from a client computing device that is in network communication with the computing system;
   responsive to receiving the query, assigning a topic to the query from amongst a plurality of predefined topics, wherein the topic is being searched for by a user of the client computing device during the search session, wherein the topic is assigned based upon a previous query received from the client computing device during the search session, wherein the query and the previous query are labeled as belonging to the search session based upon the query being received within a threshold amount of time from when the previous query was received;
   responsive to assigning the topic to the query, identifying a content retrieval rule in a database of content retrieval rules based upon a combination of the query and the topic assigned to the query, wherein the content retrieval rule maps the combination of the query and the topic to a query reformulation;
   responsive to identifying the content retrieval rule, performing a search over a document collection using the query reformulation to acquire a ranked list of search results; and
   transmitting the ranked list of search results to the client computing device, wherein the client computing device displays the ranked list of search results on a display thereof responsive to receiving the ranked list of search results.

2. The computing system of claim 1, wherein the search is performed by the search engine using both the query and the query reformulation, wherein the ranked list of search results is included in a search engine results page, and further wherein the ranked list of search results comprises content retrieved by the search engine based upon the query and the query reformulation.

3. The computing system of claim 2, the ranked list of search results comprises a first set of search results that is based upon the query and a second set of search results that is based upon the query reformulation.

4. The computing system of claim 2, the search engine results page comprising at least one of a map, an entity card, or an advertisement that is retrieved based upon the query reformulation.

5. The computing system of claim 1, wherein the topic is assigned to the query based upon a plurality of queries previously issued by a user who issued the query and the previous query, wherein each query in the plurality of queries is labeled as belonging to the search session.

6. The computing system of claim 5, wherein the topic is assigned to the query further based upon at least one of an interaction of the user with a social networking application or a network address of a computing device of the user.

7. The computing system of claim 1, the acts further comprising generating a plurality of content retrieval rules based upon search logs of a search engine, wherein the plurality of content retrieval rules comprise the content retrieval rule.

8. The computing system of claim 7, the acts further comprising assigning respective scores to the plurality of content retrieval rules, where the content retrieval rule is assigned to the query based upon a score assigned to the content retrieval rule.

9. A method comprising:
   during a search session of a user with a search engine, receiving a query from a client computing device by way of a network connection, wherein the search session comprises a previous query set forth to the search engine by the user, wherein the query and the previous query are labeled as belonging to the search session based upon the query being issued to the search engine by the user within a threshold amount of time from when the previous query was issued to the search engine by the user;
   assigning a topic to the query based upon the previous query set forth by the user during the search session, wherein the topic is assigned from amongst a plurality of predefined topics, and further wherein the topic is being searched for by the user during the search session;

identifying a content retrieval rule that is mapped to a combination of the query and the topic assigned to the query, the content retrieval rule maps the combination of the query and the topic to a query reformulation;

responsive to identifying the content retrieval rule, performing a search over a document collection using the query reformulation to acquire a ranked list of search results; and transmitting the ranked list of search results to the client computing device, wherein the client computing device displays the ranked list of search results on a display thereof responsive to receiving the ranked list of search results.

10. The method of claim 9, further comprising:
performing another search over the document collection using the query.

11. The method of claim 10, further comprising:
outputting a search engine results page based upon the search and the another search, the search engine results page includes the ranked list of search results, the ranked list of search results includes a search result retrieved in the search and another search result retrieved in the another search.

12. The method of claim 11, further comprising:
highlighting a keyword of the reformulated query in the another search result, the query free of the highlighted keyword.

13. The method of claim 9, further comprising:
performing a second search over the document collection based upon the query;
generating a search engine results page based upon the query; and
presenting the query reformulation on the search engine results page as a suggested query, wherein the search over the document collection based upon the query reformulation is performed only after the query reformulation has been selected.

14. The method of claim 9, wherein the topic is assigned to the query based further upon demographics of the issuer of the query.

15. The method of claim 9, wherein the topic is assigned to the query based further upon search results returned by the search engine that were selected or not selected by the issuer of the query when the previous query was issued.

16. A computer-readable storage medium comprising instructions that, when executed by a processor, cause the processor to perform acts comprising:
while a user of a client computing device is participating in a search session with a search engine, receiving a query from the client computing device;
responsive to receiving the query, assigning a topic to the query from amongst a plurality of predefined topics, wherein the topic is assigned to the query based upon a previous query received from the client computing device during the search session, wherein the previous query and the query are labeled as belonging to the search session based upon the query being received within a threshold amount of time from when the previous query was received, and further wherein the topic is being searched for by the user of the client computing device during the search session;
responsive to assigning the topic to the query, identifying a content retrieval rule that is mapped to a combination of the query and the topic assigned to the query, the content retrieval rule specifies a query reformulation for the query;
performing a search over a document collection based upon the query reformulation, wherein performing the search results in generation of a ranked list of search results; and
transmitting the ranked list of search results to the client computing device, wherein the client computing device displays the ranked list of search results on a display thereof in response to receiving the ranked list of search results.

17. The computer-readable storage medium of claim 16, wherein the plurality of predefined topics are based upon topics assigned to web pages in search logs of the search engine.

18. The computer-readable storage medium of claim 16, wherein the topic assigned to the query is further based upon demographics of the user who issued the query.

19. The computer-readable storage medium of claim 16, wherein the topic is assigned to the query based upon topics assigned to other queries labeled as belonging to the search session.

20. The computer-readable storage medium of claim 16, further comprising:
performing a second search over the document collection based upon the query, wherein the ranked list of search results comprises at least one search result identified in the second search.

* * * * *